Aug. 10, 1937.　　　　G. A. LYON　　　　2,089,497
TIRE COVER CONSTRUCTION
Filed Aug. 21, 1933　　　3 Sheets-Sheet 1
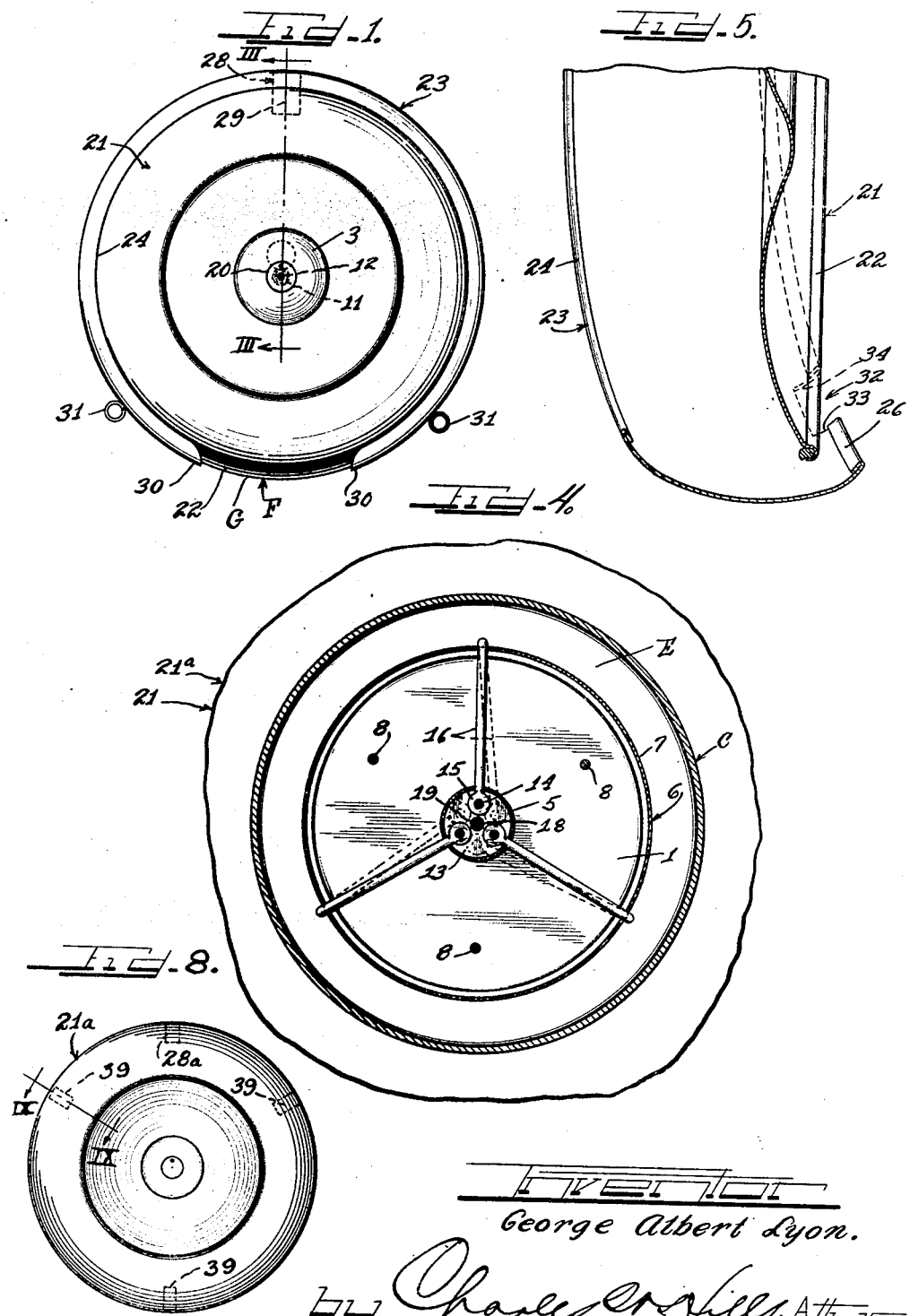
Inventor
George Albert Lyon.
by Charles... Atty.

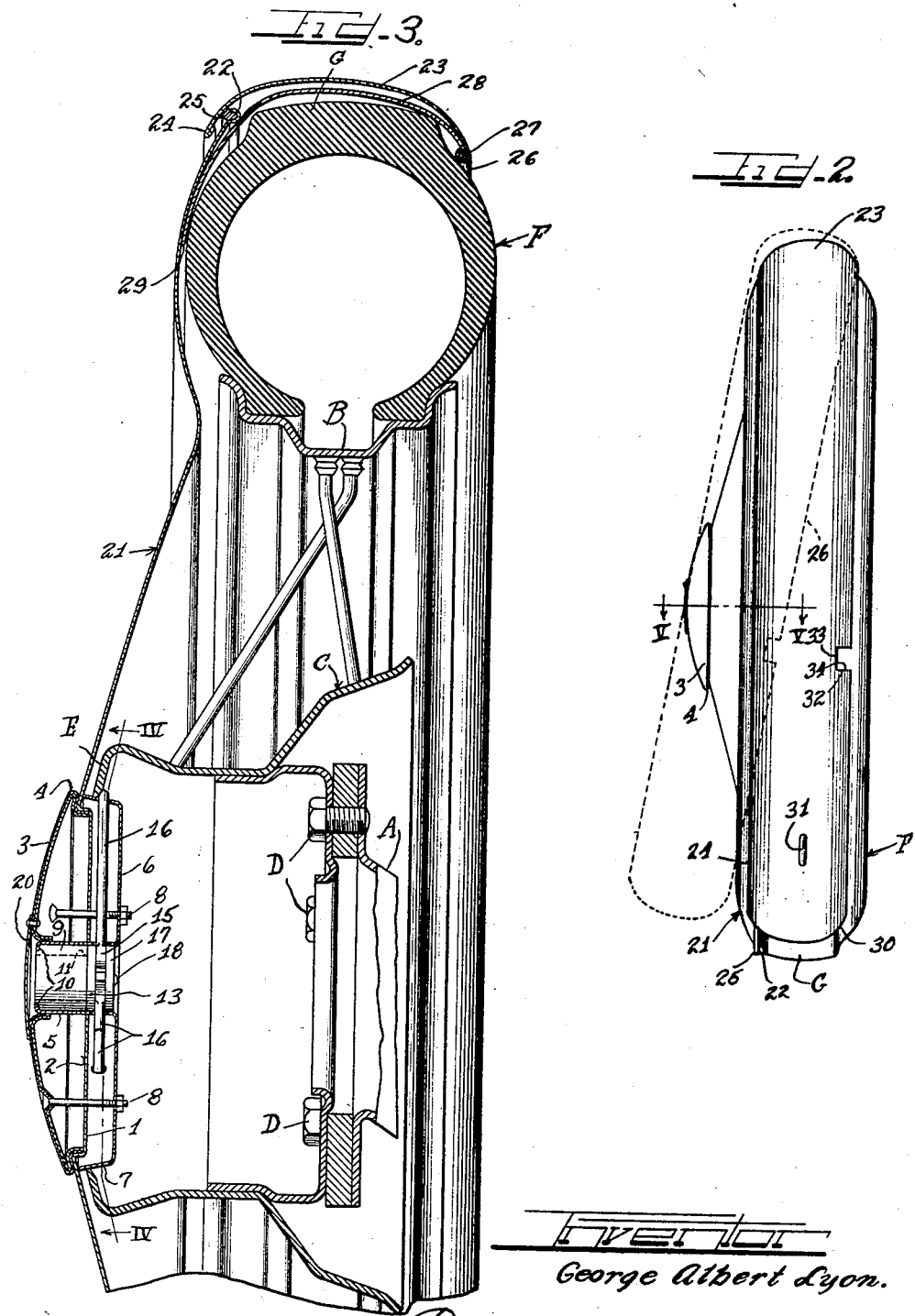

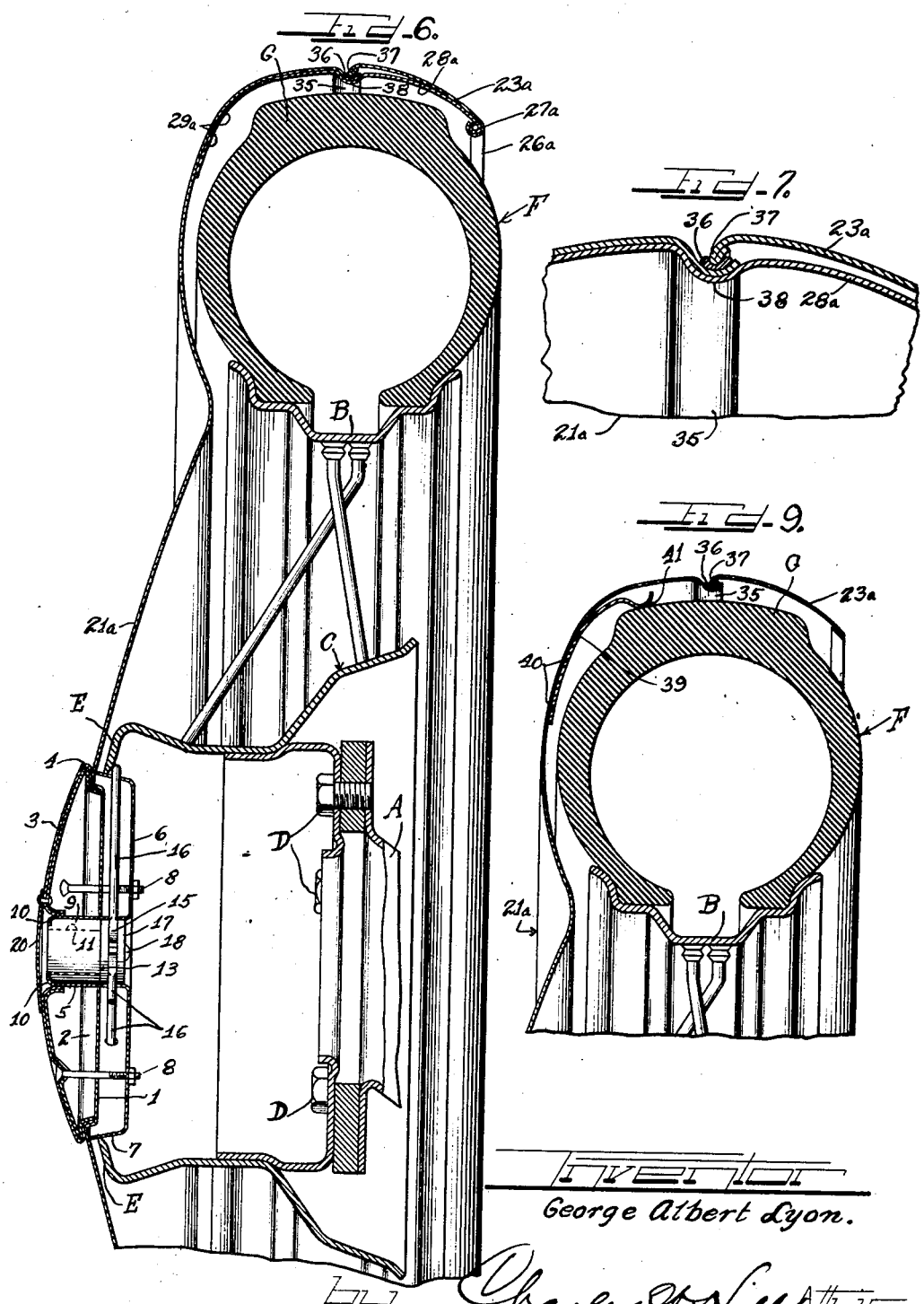

Patented Aug. 10, 1937

2,089,497

UNITED STATES PATENT OFFICE 2,089,497

TIRE COVER CONSTRUCTION

George Albert Lyon, Detroit, Mich., assignor to Lyon Incorporated, Detroit, Mich., a corporation of Delaware Application August 21, 1933, Serial No. 686,028

27 Claims. (Cl. 150—54)

This invention has to do with tire covers of the multi-part type and is concerned more particularly with a tire cover of this character embodying means whereby the same may be locked to the hub of a spare wheel carrying the tire.

It is an object of this invention to provide a tire cover comprising separable parts for covering the exposed side and tread portions of a spare tire, of such construction as to be separable from each other and yet applicable and removable as a unit with respect to the spare tire.

It is another object of the invention to provide means for locking a tire covering disc to the hub of a spare wheel carrying the tire.

It is another object of the invention to provide a composite tire cover comprising separable tire covering parts and embodying means whereby a hinge effect is established between the parts of the cover.

It is another object of the invention to provide a tire cover comprising a side wall covering portion and a tread covering portion and including a connection therebetween enabling the tread covering portion to be pivoted relative to the side wall covering portion whereby to facilitate application and removal of the cover as a whole.

It is a still further object of the invention to provide a two-part tire cover including instrumentalities for locking one of the parts to the hub of the spare wheel, leaving the other free to be moved bodily across the tread of the tire.

In carrying out the invention into practice, a side plate is provided substantially centrally with locking means cooperable with the front of the spare wheel hub to interlock therewith and thereby hold the side member theft-proof on the wheel in substantially centered relation thereto. The cover includes a preferably resilient split rim member arranged to extend substantially entirely across the tread and to overlap the side member and, by reason of its resilience, hold the side member in centered relation to the tire to enable the interlocking means to be positioned so as to function as such. A strap is arranged to extend across the tread of the tire and to be positioned between the outer peripheral portion of the disc and the adjacent side wall of the tire, the other end of the strap being hingedly connected to the rear margin of the rim portion substantially intermediate the ends of said portion. When the parts are assembled on a tire, and it is desired to remove the entire cover substantially as a unit, the end portions of the rim are spread apart to enable the same to pivot forwardly about said pivot point, thereby crossing the tread portions adjacent said ends. Notches provided adjacent the ends of the rim portion are formed so as to have at least one wall thereof catch the outer periphery of the side plate as the rim is swung forwardly, thereby causing the plate thereafter to move with the rim as the rim is continued in its forward movement until both rim and side plate are withdrawn from the tire. To facilitate grasping of the end portions of the rim for expanding the same, finger grips such as rings are secured to said end portions and project outwardly therefrom.

The parts of the cover are largely of form-retaining material such as sheet metal, any suitable locking means, either key-controlled or controlled by a safe combination, being employed in conjunction with the side plate of the tire cover. The cover construction may be employed either at the rear or any side of the automotive vehicle body, and may be employed in conjunction with a spare wheel carrier mounted to cooperate with a well such as a fender well.

In accordance with another form of the invention, the side plate member serves to cover a portion of the tread of the spare tire, and the rim portion serves to cover the remaining portion of the tread of the tire.

In each form of the invention, suitable cushioning means is provided to prevent metal to metal contact between the side and rim parts, thereby preventing rattling.

The construction is extremely simple, involving a minimum of parts assembled so as not to get out of order and constructed so as to be assembled very readily, both as to the permanently connected parts such as the locking instrumentalities, and as to the separable parts such as the side plate and rim portion  With this construction, the cover is mounted or removed, as the case may be, with substantially two operations, one consisting in the turning of the key, and the other in the shoving of the entire cover on or off the tire, as the case may be.

Other objects and advantages of the invention will appear as the description proceeds.

This invention (in preferred forms) is illustrated in the drawings and hereinafter more fully described.

On the drawings:

Figure 1 is an elevational view of a cover mounted on a tire and constructed in accordance with the present invention.

Figure 2 is an end elevation of the structure shown in Figure 1, looking from right to left.

Figure 3 is an enlarged fragmentary sectional view taken substantially in the plane designated by the line III—III in Figure 1.

Figure 4 is a fragmentary sectional view taken substantially in the plane designated by the line IV—IV in Figure 3.

Figure 5 is an enlarged fragmentary sectional view taken substantially in the plane designated by the line V—V in Figure 2, with one cover part removed from proper tire protecting position.

Figure 6 is a view similar to Figure 3 but shows a modified form of the invention.

Figure 7 is an enlargement of the upper part of Figure 6 to show more clearly the details.

Figure 8 is a front elevation of the cover structure shown in Figures 6 and 7.

Figure 9 is an enlarged fragmentary sectional view taken substantially in the plane designated by the line IX—IX in Fig. 8.

As shown on the drawings:

Referring now more particularly to the drawings, an automotive vehicle (not shown) is provided with a preferably permanently secured tire carrier A at any part thereof, whether adjacent a fender well or otherwise, for supporting a spare wheel B through the hub C thereof by means of bolts D accessible for manipulation only through the front wall E of the hub. The locking instrumentalities for the tire cover may be of any character desired, that shown herein being presented for illustrative purposes only. The lock construction in connection with the form of tire cover structure shown in Figure 3 is preferably substantially the same as that in conjunction with the forms of the invention shown in Figures 6 to 9, so that a single description will suffice for all. The tire cover side plate member in each case is formed with a substantially centrally arranged depression 1 in which the inner peripheral wall 2 of a cup-like housing member 3 is preferably snugly received, said member 3 being preferably formed with an outwardly extending flange 4 for engaging the front side of the cover plate adjacent said depression to thereby completely conceal the depression. The cup member 3 is preferably bulged forwardly for the purpose of strength, and this feature is preferably enhanced by making the cup-like member 3 double-walled or laminated. The cup member 3 is preferably of such configuration as to simulate the corresponding configuration of a hub cap, preferably the particular hub cap design employed in connection with the vehicle employing a tire cover construction embodying the present invention. The cup 3 is formed centrally with a flared opening extending rearwardly for preferably snugly receiving the forwardly extending central sleeve boss 5 of a complemental cup 6, the latter having its peripheral wall 7 substantially frusto-conical and extending forwardly into engagement with the rear surface of the cover plate. Bolts 8, rivets or the like extending through registering holes in the cups 3 and 6 and the depression 2 serve to securely hold the cup parts 3 and 6 of the lock housing in properly assembled relation with the depression 1 of the cover.

The locking instrumentalities illustrated comprise a stationary barrel 9 held from rotating by reason of its being interlocked with the tongues 10 of the sleeve 5, and a lock cylinder element 11 disposed therein and provided with a hole 12 (Figure 1) for the reception of a key (not shown) for manipulating the same. The lock cylinder 11 is provided with a rearwardly disposed flange 13 provided with studs 14 passing through eyes 15 in the latch pins 16, the parts being held in assembled relation by means of an assembly plate 17 secured in position by a stud or screw 18, a spacer sleeve 19 being positioned about the stud 18 between the flange 13 and plate 17 to hold the same spaced apart sufficiently to permit of free pivotal movement of the latch pins 16 about the studs 14. The sleeve 5 and outer wall 7 of the cup 6 are formed with a pair of registering openings for each latch pin 16, said openings being of sufficient size to enable the eyes 15 to pass therethrough in order that the locking instrumentalities may be properly assembled therewith, and to enable the pins to swing as they pivot about their respective studs 14. The frusto-conical shape of the outer peripheral wall 7 of the inner cup member 6 serves to facilitate entry of the cup 6 into the forward opening in the hub C, and also affords a wedging engagement with the mouth of the forward wall E at said opening. The pins are arranged rearwardly of the line of engagement of the wall 7 with the front wall E of the hub C so that when said pins are disposed in locking position as shown on the drawings, said pins and said frusto-conical wall 7 are engaged with the hub wall C in such a manner as to be interlocked therewith and inhibit rattling therebetween.

The opening in the cup 3 may be closed, if desired, by a hinged door or cap 20.

The lock instrumentalities thus operate to prevent access to the wheel mounting bolts D, and thus serve to lock the wheel B, tire F and cover to the automotive vehicle body on which the carrier A is mounted.

The tire cover construction of each of the illustrated forms of the invention embodies a member for covering the front side of the spare wheel and tire, and is provided with a contour and shape substantially conforming to the front side of the spare wheel and tire so as to substantially simulate the shape thereof. To this end, the part of the cover adjacent the front wall of the tire is of arcuate section, and the wheel covering part is disposed forwardly, said parts leaving therebetween an annular rearwardly extending depression positioned adjacent the rim of the wheel.

The tire cover construction shown particularly in Figures 1, 2, 3 and 5 embodies an arcuate side plate 21 in the form substantially of a disc having its outer peripheral margin 22 terminating adjacent the forward longitudinal edge portion of the tread G of the tire F.

The tire cover includes a tread covering member in the form of a split arcuate resilient rim member 23 which is preferably concavo-convex in cross section, that is, channel-like, with its margins disposed inwardly of the remainder thereof. The rim member 23 extends peripherally about substantially more than 180° of the tire tread and extends transversely so as to be disposed in substantially straddling relation to the tread G, and so that its front margin 24 overlaps and conceals a major portion of the side plate margin 22 as shown in detail in Figures 2 and 5. The normal diameter of the rim 23 is preferably substantially less than the diameter of the tread of the tire so that when the rim member 23 is disposed in proper tread covering position, it hugs the tread and thus exerts pressure upon the outer periphery 22 of the side plate, resiliently urging the same rearwardly toward the tire F. To the end that rattling between the parts 21 and 23 may be obviated, a cushioning strip 25 is secured to the margin 22 and engages the rim 23 in such a manner as to hold the same at all times spaced from the plate 21. The strip is preferably of soft rubber, although any other suitable material which will serve the same purpose may be employed. Moreover, the strip of cushioning material may be carried by either part of the cover, although it is preferably carried by the side plate as shown.

Secured substantially midway of the length of the rim 23 and to the rear margin 26 thereof and in pivotal relation thereto as shown at 27 is a strap 28 which may be resilient or relatively stiff, as desired. The strap is disposed inwardly of and extends forwardly from the rear margin 26 of the rim member 23, and is curved forwardly and inwardly to generally conform to the tread and adjacent portion of the front wall of the tire F as shown in Figure 3. The forward and downwardly extending portion 29 of the strap 28 is formed to be disposed between the outer peripheral marginal portion of the side plate 21 and the adjacent outer side wall portion of the tire F, and serves as a releasable anchor, about the rear end of which the rim member 23 is capable of being pivoted.

The rim member 23 is provided adjacent its ends 30 with finger grip rings or handles 31 projecting outwardly therefrom so that said end portions may be readily and firmly grasped to facilitate the exertion of expanding pressure upon said ends 30 to thereby expand the rim member 23. The rim member 23 is provided with notches in its rear margin 26 as shown at 32, said notches being arranged substantially equidistant from the pivot 27 and preferably more than 180° apart as shown in Figure 2. Only one of the notches 32 is seen on the drawings, but as a matter of fact one is disposed on each side of the rim 23. Each of the notches 32 functions in the same manner as the other, so that the description which is to follow in connection with the notch which is visible in Figures 2 and 5 is to be understood to be equally applicable to the other notch 32. The notch 32 has transversely extending walls 33 and 34, and is of such extent, circumferentially, that when the rim member 23 is swung forwardly to the position shown in Figure 2 so that the rear marginal edge 26 thereof extends diagonally, the rearmost extremities of the respective walls are disposed in horizontally spaced vertical planes parallel to the median plane of the tire.

The marginal portion 26 at the rear of the rim 23 is bent inwardly upon itself to provide a smooth edge, and the walls 33 and 34 of each notch 32 are consequently doubled at their outer extremities. The doubled portion 35 at the wall 33 affords an obstruction which, as soon as the wall 34 passes forwardly of the cushioning strip 25 of the side plate 21, abuts said strip interlockingly in such a manner that, as the rim member 23 is further pivotally moved forwardly about the pivot 27, it carries the side plate member 21 therewith (after first unlocking the key-controlled instrumentalities from the hub C). Thus by virtue of the construction described, both the rim member and the side plate member may be moved practically as a unit in response to substantially a single operation by which the end portions 30 of the rim member 23 are expanded sufficiently to pass across the tread G of the spare tire F and continuing to pull said end portions 30 forwardly.

When the forward pivotal movement of the lower part of the rim member 23 is in its initial stage, the rear margin 26 thereof engages the cushioning strip 25 and is worked gradually forwardly across the same. Were the notches 32 not provided, that is, were the rear marginal edge 26 uninterrupted, then the progressive movement of the rear margin 23 across the cushioning strip 25 would be continued until completed, without causing an interlock of the side plate 21 and the rim member 23. During the working of the rear margin 26 of the member 23 forwardly across the cushioning strip 25, the inherently contractive force exerted upon the end portions of the rim member 23 causes the margin 26 to press inwardly upon the strip 25, and when the wall 34 of the notch 32 has moved across the strip 25, continued pivotal movement of the rim member 23 results in a substantially snapping engagement between the wall 33 and the strip 25 and marginal portion 22 associated therewith. The wall 33 operates substantially the same as a spring-pressed pawl would operate under similar circumstances.

When the cover structure is removed from the tire, it is not necessary to separate the side plate and rim parts thereof. Since the notches 32 are arranged in excess of 180° apart, and the portions of the side plate cooperating therewith when the interlock takes place are also in excess of 180° apart, the cover parts will be interlocked even after they are removed from the spare tire. They may, of course, be readily released simply by expanding the end portions 30 of the rim member 23. However, if there is no need for separating the parts 21 and 23, they may be allowed to remain connected and thereafter applied to a spare tire by substantially a single operation which is the reverse of that just described for removing the cover from the tire.

If, however, the parts 21 and 23 are entirely separate from each other and it is desired to mount the same in proper cooperative relation upon a spare tire, the side plate 21 is first preferably interlocked with the forward wall E of the hub C as shown in Figure 3 and, thereafter, the rim member 23 is held in an inclined plane with its upper part rearmost and disposed over the spare tire in such position that the forward end of the strap 28 may be readily moved forwardly to a position between the outer marginal portion of the plate 21 and the adjacent outer portion of the front wall of the tire F. After this operation is performed, the rim member 23 may be allowed to swing rearwardly about the pivot 27, and by grasping the ring parts 31 and spreading the ends 30 apart, said ends may be shoved rearwardly across the strip 25 and tread G until it occupies substantially the position shown in Figure 2 in full lines.

If desired, the forward end portion 29 of the strap 28 may be permanently fastened to the associated outer peripheral part of the plate 21, as by spot welding, so that, while the same freedom of pivotal movement of the rim member 23 relative to the side plate 21 will still be afforded, yet the connection between the strap and the side plate 21 would serve to always hold the parts connected so that application thereof to a spare tire will be somewhat facilitated.

The form of the invention appearing in Figures 6 to 9 differs from that just described only in the fact that the outer peripheral portion of the side plate 21a, instead of terminating adjacent the forward margin of the tire tread G, extends rearwardly about approximately one-half the tread of the tire, and the split resilient ring or rim 23a is in consequence of less transverse extent so as to cover substantially only the portion of the tread which is not covered by the side plate 21a. The side plate member 21a is formed at its outer margin with a substantially circular transversely arcuate and internally rounded bead or lip 35 lined on its outer concave side with a continuous or plurality of spaced strips of cushioning material such as soft rubber indicated at 36, providing a peripheral groove in which the forward and inwardly turned margin 37 of the rim member 23a is resiliently imbedded. The inherently contractive tendency of the resilient rim member 23a serves to hold the marginal portion 37 thereof in contact with the lining material 36 under pressure, said material serving to prevent contact between the parts 21a and 23a to thereby prevent rattling therebetween as well as to provide friction preventing undesired relative movement therebetween.

The strap member 28a corresponds to the strap member 28 described in connection with the first mentioned form of the invention and may be resilient or relatively rigid also. The rear end of the strap 28a is connected to the margin 26a of the rim member 23a at 27a, and has its forward end portion 29a positioned against the inner surface of the outer peripheral portion of the side plate 21a and between the same and the adjacent portions of the front side wall and tread of the tire F as shown in Figure 6. The forward portion of the strap 28a may be entirely separable or may be spot-welded at 29a to the side plate 21a, as described above in connection with the first form of the invention. The strap 28a is provided with a depression 38 to preferably snugly receive the bead or lip 35 at the outer peripheral margin of the side plate 21a. The rim member 23a is provided with notches (not shown) in its rear margin 26a, the walls of said notches cooperating with the lip 35 and associated cushioning material 36 in substantially precisely the manner in which the notches 32 cooperate with the plate 31 previously described, so that a repetition of illustration and word description of such cooperation is omitted to avoid unnecessary duplication.

To facilitate centering the side plate 21a with respect to the spare wheel so as to readily move the cup member 6 into the opening in the front wall E of the hub C, there is provided a plurality of spring fingers 39 preferably rigidly secured to the interior surface of the side plate 21a as by spot-welding at 40, riveting or the like. The fingers 39 extend preferably outwardly from the points of connection thereof with the side plate 21a and are provided with inwardly rounded guiding or contact portions 41 whose inner engaging surfaces are arranged in a circumference of less radius than the adjacent forward tread portions. In the mounting of the sideplate, the said plate is shoved in a substantially axial direction toward the tire, the spring fingers 39 engaging the forward marginal portion of the tread G and being cammed outwardly thereby, the portions 41 yieldably gripping the tread G and thereby guiding the side plate as the same is shoved further rearwardly on the tire. The portions 41 of the spring fingers 39 serve also to position the cup member 6 of the locking instrumentalities in substantially coaxial relation with the hub C so that as the side plate is shoved rearwardly on the tire, said cup member 6 moves into the hub until it is in substantially wedging engagement therewith as explained hereinabove. With the parts thus arranged, the spring fingers 39 exert sufficient pressure to temporarily hold the side plate 21a in position with its cup member 6 disposed substantially in wedging engagement with the hub at the forward wall E thereof, so that a key may be inserted in the hole 12 and rotated to force the latch pins outwardly into interlocking engagement with the hub C. The rim member 23a, as above explained, cooperates with the side plate 21a in substantially exactly the same way in which the rim member 23 cooperates with the outer peripheral portion of the side plate 21, both in the mounting and the removal of the cover with respect to the spare tire.

It will be observed that, whether one or the other of the forms of the invention herein disclosed is employed, once the side plate is interlocked with the hub, unauthorized removal of the spare wheel, spare tire and side plate, is prevented. Where the rim member is permanently secured to the side plate as by the strap 28 or 28a, locking of the side plate results also in locking of the rim. Moreover, where the cover construction in accordance with the present invention is employed in connection with a well such as a fender-well, the end portions of the rim project downwardly into the mouth of the well, suitable provision being made for the finger rings 31, so that, under such circumstances, regardless whether the rim is permanently connected to the side plate, once the side plate is locked to the hub, the entire cover as well as the spare tire and spare wheel, is locked against unauthorized removal.

The handles or grasping members 31 may be secured to the rim in any suitable way, as by including portions flattened or enlarged adjacent the outer and inner surfaces of the rim in rivet fashion, the inner flattened or headed portion being sufficiently close to the inner surface of the rim as not to interfere with the proper positioning of the rim with respect to the tire and side plate and with the proper cooperation of the tire cover parts with each other and with the tire.

The invention involves very few parts which are made to readily cooperate with one another without difficulty, the parts themselves being of simple construction so that the same may be easily made at a low cost of manufacture. While sheet metal is preferred as the material from which the side plate, rim and lock housing are made, it is to be understood that any other suitable form-retaining material such as a molded rubber composition or a product of phenolic condensation or other material may be employed.

I am aware that many changes may be made and numerous details of construction may be varied through a wide range without departing from the principles of this invention, and I therefore do not purpose limiting the patent granted hereon otherwise than necessitated by the prior art.

I claim as my invention:

1. A cover comprising a part shaped to conform generally with the outer side of a spare tire and having means whereby said part may be supported in substantially coaxial relation to the tire, and a tread covering member extending throughout more than 180° and formed to overlap the outer peripheral margin of said part, said member being contractible to hold itself in proper tire protecting position, and expansible so that the rear edge thereof may be shoved forwardly and progressively across the thread and said margin, said member having shoulders arranged in excess of 180° apart and engageable with said margin to interlock therewith whereby, when said supporting means is released, said part is removed with said member.

2. A spare tire covering comprising a part shaped to cover the outer side wall of the tire, a resilient, split, circular tread covering member shaped to extend substantially more than 180° about the tire tread and having a peripheral margin contractible inwardly of the outer peripheral margin of said part and movable diagonally across the tread into engagement with the first margin when said member is being removed from the tire, one of said margins having notches disposed more than 180° apart, as measured along said member, and into which the other margin snaps by virtue of the contractibility of the margin of said member, thereby temporarily interlocking said part and member so that they may be removed and mounted as a unit with respect to the tire.

3. A spare tire cover comprising a side wall covering part and a tread covering part formed to be lapped when in proper tire protecting position, the outer of said parts being inherently contractible inwardly of the other part, said parts having means at their margins constructed and arranged to positively interlock upon contraction of said outer part when said margins are interengaged in intersecting planes, to enable said parts to be moved as a unit in their application to and removal from a spare tire.

4. A spare tire cover comprising a side wall covering part, means for mounting said part in proper tire protecting position, a tread covering part comprising a resilient split band inherently contractible inwardly of the outer peripheral margin of the first part, an anchor hinged to the second part intermediate the ends of the second part and having its free end for disposition between the first part and the tire, whereby when the ends of the band are pulled forwardly across the tread and said margin, said anchor causes the band to swing upwardly, one of said parts having a catch snappingly interlockable with the other part to interconnect the same, as said band is worked progressively across said margin, whereby when said mounting means is released, said parts may be moved as a unit in their application to and removal from a spare tire.

5. A spare tire cover comprising a substantially circular member, a strap hinged to said member, and means for anchoring the strap in association with the tire tread to enable the member to swing as it is applied to and removed from the tire, said member being formed to exert inward pressure upon the tire to hold itself thereon.

6. A spare tire cover comprising a circular member formed to cover a part of the tire, and means associated with said member for pivotally supporting said member from the tire to enable the member to swing as it is applied to and removed from the tire, said means including a second circular member for covering another part of the tire, and means for supporting said second member independently of the first member.

7. A spare tire cover comprising a circular member formed to cover a part of the tire, and means associated with said member for pivotally supporting said member from the tire to enable the member to swing as it is applied to and removed from the tire, said means including a second circular member for covering another part of the tire, and means for supporting said second member independently of the first member, said members having interlockable portions interengageable after said first member is swung through a predetermined angle relative to said second member, whereby as said first member is swung further it carries the second member therewith.

8. A spare tire cover comprising a substantially circular plate member provided with means for locking the same to the hub of a spare wheel carrying the tire, a split resilient tread covering rim member contractible to a diameter less than that of the plate member and expansible to pass across the outer margin of said plate member, means cooperating with said plate member to afford a hinge support for an intermediate part of the rim member so that the ends of said rim member may be swung across said plate member, said members being formed to interlock as said rim member is swung so that said members may be removed as a unit when the locking means is released.

9. A spare tire cover comprising a substantially circular plate member provided with means for locking the same to the hub of a spare wheel carrying the tire, a split resilient tread covering rim member contractible to a diameter less than that of the plate member and expansible to pass across the outer margin of said plate member, means cooperating with said plate member to afford a hinge support for an intermediate part of the rim member so that the ends of said rim member may be swung across said plate member, said members being formed to interlock as said rim member is swung so that said members may be removed as a unit when the locking means is released, the margin of said plate member being formed to terminate adjacent an edge of the tread so as to be readily engaged by the rim member as the latter passes the tread.

10. A spare tire cover comprising a substantially circular plate member provided with means for locking the same to the hub of a spare wheel carrying the tire, a split resilient tread covering rim member contractible to a diameter less than that of the plate member and expansible to pass across the outer margin of said plate member, means cooperating with said plate member to afford a hinge support for an intermediate part of the rim member so that the ends of said rim member may be swung across said plate member, said members being formed to interlock as said rim member is swung so that said members may be removed as a unit when the locking means is released, said plate member being formed to extend across a part of the tread and said rim member being formed to cover a major part of the remainder of the tread.

11. A spare tire cover comprising a substantially circular plate member provided with means for locking the same to the hub of a spare wheel carrying the tire, a split resilient tread covering rim member contractible to a diameter less than that of the plate member and expansible to pass across the outer margin of said plate member, means cooperating with said plate member to afford a hinge support for an intermediate part of the rim member so that the ends of said rim member may be swung across said plate member, said members being formed to interlock as said rim member is swung so that said members may be removed as a unit when the locking means is released, said members being lapped when in proper tire protecting position.

12. A spare tire cover comprising a substantially circular plate member provided with means for locking the same to the hub of a spare wheel carrying the tire, a split resilient tread covering rim member contractible to a diameter less than that of the plate member and expansible to pass across the outer margin of said plate member, means cooperating with said plate member to afford a hinge support for an intermediate part of the rim member so that the ends of said rim member may be swung across said plate member, said members being formed to interlock as said rim member is swung so that said members may be removed as a unit when the locking means is released, said members being lapped when in proper tire protecting position, and cushioning means holding said members in spaced relation to each other when said members are so positioned.

13. A spare tire cover comprising an expansible and contractible circular member formed to cover a part of the tire, and means associated with said member for pivotally supporting said member from the tire to enable the member to swing about an axis substantially parallel to its plane as it is applied to and removed from the tire, said member being formed to exert inward pressure upon the tire to hold itself thereon, and handle means carried by said member for enabling the same to be readily grasped so that force may be readily and effectively applied to expand and swing said member.

14. A spare tire cover comprising a circular member formed to cover a part of the tire, and means associated with said member for pivotally supporting said member from the tire to enable the member to swing as it is applied to and removed from the tire, said means including a second circular member for covering another part of the tire, and locking means for cooperating with the hub of a spare wheel carrying the tire for locking the second member in proper tire protecting position independently of the first member.

15. A spare tire cover comprising a substantially circular plate member provided with means for mounting the same in proper tire protecting position, a split resilient tread covering rim member contractible to a diameter less than that of the outer periphery of the plate member and expansible to pass across said periphery, means cooperating with said members and affording a hinge support for an intermediate part of the rim member so that the ends of said rim member may be swung across said plate member, said members being constructed and arranged to interlock as said rim member is swung so that said members may be removed as a unit when the mounting means is released.

16. A spare tire cover comprising a substantially circular plate member provided with means for mounting the same in proper tire protecting position, a split resilient tread covering rim member contractible to a diameter less than that of the outer periphery of the plate member and expansible to pass across said periphery, means cooperating with said members and affording a hinge support for an intermediate part of the rim member so that the ends of said rim member may be swung across said plate member, said members being constructed and arranged to interlock as said rim member is swung so that said members may be removed as a unit when the mounting means is released, and cushioning means holding said members in spaced relation to each other when said members are in proper tire protecting position.

17. A spare tire cover comprising a plate for covering the front wall of a tire, means for securing the plate in proper tire protecting position, a band for disposition over the tread of the tire, and a strap secured to said plate and pivoted to the band and arranged to enable the band to swing across the plate whereby the band is pivotally supported from the plate.

18. A spare tire cover comprising a plate for covering the front wall of a tire, and provided with a peripheral recess, means for securing the plate in proper tire protecting position, an expansible and contractible band for covering the tread of the tire and having an inturned margin engageable in said recess when the band is contracted whereby to support the band in proper tire protecting position, and a strap secured to the plate and pivoted to the band and arranged to enable the band to swing across the plate as the band is removed from and applied to its operative position relative to the tire.

19. A spare tire cover comprising a plate for protecting the front of a tire, means for securing the plate in proper tire protecting position, an expansible and contractible band for protecting the tread of the tire, a strap secured to the plate and pivoted to the band and arranged to enable the band to swing across the plate, said plate and band being constructed and arranged to positively interlock when the band is swung across the plate from proper tire protecting position, whereby to prevent relative pivotal movement of the plate and band and thereby facilitate removal thereof from the tire as a unit.

20. A multi-part cover for an assembly including a tire connected by means laterally within the tire to a part disposed centrally of the tire, said cover comprising a side plate structure for disposition over a side of the assembly, a circular part for disposition over the tire tread, said structure including substantially centrally disposed releasable theftproof locking means cooperative with the centrally disposed part for supporting said structure from the centrally disposed part in centered relation to the tire, said circular part including a portion disposed behind said structure and held by said means against unauthorized removal.

21. A multi-part cover for an assembly including a tire connected by means laterally within the tire to a part disposed centrally of the tire, said cover comprising a side plate structure for disposition over a side of the assembly, a circular part for disposition over the tire tread, said structure including substantially centrally disposed releasable theftproof locking means cooperative with the centrally disposed part for supporting said structure from the centrally disposed part in centered relation to the tire, said circular part including a portion disposed behind said structure and held by said means against unauthorized removal, and anti-rattle cushion means disposed between said structure and said circular part.

22. In an assembly including a tire connected to a part disposed centrally of the tire, a tread covering member formed to hook over the tread of the tire and be swung rearwardly into the plane of the tire in covering relation to the tread, a shield member for disposition over the outer side of the assembly, and releasable theftproof means cooperative with a substantially central part of the shield member and the first part for mounting said shield member from the first part in centered relation to the assembly, the first member being held by the shield member against unauthorized removal.

23. In an assembly including a tire connected to a part disposed centrally of the tire, a tread covering member formed to hook over the tread of the tire and be swung rearwardly into the plane of the tire in covering relation to the tread, a shield member for disposition over the outer side of the assembly, and releasable theftproof locking means cooperative with a substantially central part of the shield member and the first part for mounting said shield member from the first part in centered relation to the assembly, a part extending inwardly from the first member and overlapped by the shield member and prevented by the latter from removal while said means is locked.

24. In an assembly including a tire connected to a part disposed centrally of the tire, a tread covering member formed to hook over the tread of the tire and be swung rearwardly into the plane of the tire in covering relation to the tread, a shield member for disposition over the outer side of the assembly, and releasable theftproof locking means cooperative with a substantially central part of the shield member and the first part for mounting said shield member from the first part in centered relation to the assembly, said members having cooperative holding means at the outer peripheral portion of the shield member for preventing removal of the first member from the tire while said means is locked.

25. In an assembly including a tire connected to a part disposed centrally of the tire, a tread covering member formed to hook over the tread of the tire and be swung rearwardly into the plane of the tire in covering relation to the tread, a shield member for disposition over the outer side of the assembly, and releasable theftproof means cooperative with a substantially central part of the shield member and the first part for mounting said shield member from the first part in centered relation to the assembly, the first member having a part extending inwardly at the outer side of the assembly behind the shield member and cooperative with the latter to prevent removal of the first member until the shield member is removed.

26. A multi-part cover for an assembly including a tire connected by means laterally within the tire to a part disposed centrally of the tire, said cover comprising a side plate structure for disposition over a side of the assembly, a circular part for disposition over the tire tread, said structure including substantially centrally disposed releasable theftproof locking means cooperative with the centrally disposed part for supporting said structure from the centrally disposed part in centered relation to the tire, said circular part including a portion disposed behind said structure and held by said means against unauthorized removal, and means for protecting said locking means from dust and other foreign matter.

27. A multi-part cover for protecting an assembly including a tire connected by means laterally within the tire to a part disposed centrally of the tire, said cover comprising a resilient split rim formed for disposition over more than half the periphery of the tire tread, a side plate structure for disposition over a side of the assembly and including substantially centrally disposed releasable theftproof locking means cooperative with the first part for locking said structure in substantially centered relation to the assembly, and means connecting part of said structure to part of said rim, leaving the remainder of said rim free of said structure.

GEORGE ALBERT LYON.